United States Patent

Kitahara et al.

[11] Patent Number: 5,885,336
[45] Date of Patent: Mar. 23, 1999

[54] RECORDING INK, INK CARTRIDGE CONTAINING THE SAME, AND INK-JET RECORDING METHOD BASED ON THE USE OF THE SAME

[75] Inventors: Takeo Kitahara; Hideto Yamazaki; Masahito Kato; Masaya Fujioka, all of Nagoya; Shunichi Higashiyama, Yokkaichi, all of Japan

[73] Assignee: Brother Kogyo Kabushiki Kaisha, Nagoya, Japan

[21] Appl. No.: 838,528

[22] Filed: Apr. 9, 1997

[30] Foreign Application Priority Data

Apr. 17, 1996 [JP] Japan ................... 8-095212

[51] Int. Cl.$^6$ ................... C09D 11/02
[52] U.S. Cl. ................... 106/31.27; 106/31.32; 106/31.6; 106/31.64
[58] Field of Search ................... 106/31.27, 31.6, 106/31.95, 31.32, 31.64

[56] References Cited

U.S. PATENT DOCUMENTS

| | | | |
|---|---|---|---|
| 4,285,727 | 8/1981 | Uehara et al. | 106/31.58 |
| 4,775,416 | 10/1988 | Bevege et al. | 106/31.95 |
| 5,441,561 | 8/1995 | Chujo et al. | 106/31.33 |
| 5,637,138 | 6/1997 | Yamazaki | 106/31.32 |
| 5,645,630 | 7/1997 | Yamazaki | 106/31.32 |
| 5,656,072 | 8/1997 | Kato et al. | 106/31.58 |
| 5,755,861 | 5/1998 | Fujioka et al. | 106/31.27 |

FOREIGN PATENT DOCUMENTS

| | | |
|---|---|---|
| A 50-15622 | 2/1975 | Japan . |
| A 52-12010 | 7/1977 | Japan . |
| A 53-61412 | 6/1978 | Japan . |
| B2 54-16243 | 6/1979 | Japan . |
| A 55-43153 | 3/1980 | Japan . |
| B2 62-1982 | 1/1987 | Japan . |
| 1526017 | 9/1978 | United Kingdom . |

*Primary Examiner*—Helene Klemanski
*Attorney, Agent, or Firm*—Oliff & Berridge, PLC

[57] ABSTRACT

A recording ink composition comprises pure water, a water-soluble dye, a polyvalent alcohol, and phosphoric acid. When iron is contained as an impurity in the recording ink composition, the iron and phosphoric acid form a ferric (III) phosphato complex ion represented by $[Fe(HPO_4)(H_2O)]^+$. Owing to the formation of the complex ion, the recording ink composition is prevented from discoloration which would be otherwise caused by iron ion. Further, the recording ink composition is prevented from formation and deposition of iron compounds. Therefore, the obtained ink has an excellent color tone, and the ink avoids blocking at a nozzle of a printing head or the like of an ink-jet printer.

20 Claims, No Drawings

RECORDING INK, INK CARTRIDGE CONTAINING THE SAME, AND INK-JET RECORDING METHOD BASED ON THE USE OF THE SAME

FIELD OF THE INVENTION

The present invention relates to a recording water-based ink to be used for recording apparatuses such as ink-jet printers. The present invention also relates to an ink cartridge containing the recording water-based ink, and an ink-jet recording method based on the use of the recording water-based ink.

DESCRIPTION OF THE RELATED ART

Many patent applications have been heretofore filed, concerning inventions of water-based inks to be used for recording apparatuses such as ink-jet printers. For example, Japanese Patent Laid-Open No. 50-15622 discloses a water-based ink composition comprising a water-soluble dye, water, and sulfolane. In this patent document, it is reported that characteristics such as color development of the dye, water resistance, and drying resistance are improved, and the increase in viscosity is suppressed, owing to sulfolane contained in the ink composition, by the aid of the dipole interaction exerted between sulfolane and the dye or the harmonizing force effected between sulfolane and cellulose for constructing the paper surface.

Japanese Patent Laid-Open No. 52-12008 (Japanese Patent Publication No. 54-16243) discloses a water-based ink for jet printing, comprising a water-soluble direct dye having a specified structure and sodium dehydroacetate as a mildewproofing agent. It is demonstrated that insoluble solid matters, which may cause nozzle blocking, are scarcely produced, and the ink is extremely excellent in jetting stability, owing to the combination of the water-soluble direct dye having the specified structure and sodium dehydroacetate contained in the ink.

Japanese Patent Laid-Open No. 52-12010 discloses a water-based ink for jet printing, comprising a water-soluble dye having a specified structure and 6-acetoxy-2,4-dimethyl-m-dioxane as a mildewproofing agent. It is demonstrated that occurrence of fungi can be avoided over three months or more under a continuous jetting condition, and the nozzle can be prevented from blocking because no insoluble solid matter is produced, owing to the combination of the water-soluble dye having the specified structure and 6-acetoxy-2,4-dimethyl-m-dioxane contained in the ink.

Japanese Patent Laid-Open No. 53-61412 and UK Patent Publication GB 1526017 corresponding thereto disclose an ink for ink-jet recording, the ink comprising major components of a wetting agent, a water-soluble dye, and water, and further comprising an oxygen absorber such as iron, sodium sulfite, and ammonium sulfite. In the invention described in the patent documents, the oxygen absorber serves to remove dissolved oxygen in the ink. The dissolved oxygen would otherwise badly affect the ink drop-jetting property of a recording head to be used for ink-jet printing.

Japanese Patent Laid-Open No. 55-43153 discloses preparation of an ink for ink-jet recording, having a low viscosity and a low freezing point, by adding a predetermined amount of a freezing mixture composed of an inorganic salt to an ink material comprising water, a water-soluble dye, and a polyvalent alcohol. Those exemplified as the freezing mixture composed of the inorganic salt include various chlorides, nitrates, and sulfates.

It has been demanded to develop a water-based ink for recording, provided with dissolving stability and color tone which are more excellent than those of the conventional water-based inks for recording. In order to respond to the demand, it has been attempted to add a chelating agent to an ink composition. For example, in Japanese Patent Publication No. 62-1982 and U.S. Pat. No. 4,285,727 corresponding thereto, a chelating reagent is added to an ink composition comprising water as a major component, a water-soluble dye, a polyvalent alcohol, and potassium carbonate so that the ink composition is prevented from occurrence of precipitates which may be produced from calcium ion and other metal ions contained in the dye.

However, in general, the chelating agent is scarcely soluble in water, and the chelating agent is usually a solid. Therefore, the chelating agent is occasionally deposited from the ink. For this reason, a problem arises in that when the chelating agent is used for ink-jet recording, a nozzle or the like is apt to suffer blocking. Even when a chelating agent is dissolved in an ink, if the ink contains a metal ion such as iron ion which forms a colored aqueous solution, the ink does not become colorless regardless of any addition of the chelating agent. As a result, such an ink has an unfavorable color tone. Therefore, it has been difficult to obtain a recording water-based ink having an excellent color tone without causing any deposition resulting from metal ion.

SUMMARY OF THE INVENTION

The present invention has been made in order to solve the problems involved in the conventional techniques described above, an object of which is provide a recording water-based ink suitable for ink-jet recording to give an excellent color tone on a recorded matter, an ink cartridge containing the ink, and an ink-jet recording method based on the use of the ink.

Another object of the present invention is to provide a recording water-based ink which makes it possible to avoid occurrence of precipitates produced from iron ion even when the ink composition contains iron, and an ink-jet recording method based on the use of the ink.

According to a first aspect of the present invention, there is provided a recording ink comprising:

water;

a coloring agent;

iron; and a phosphorus-containing substance for forming a ferric (III) phosphate complex ion represented by $[Fe(HPO_4)(H_2O)]^+$ in the presence of iron.

The recording ink according to the present invention contains the phosphorus-containing substance which forms the ferric (III) phosphate complex ion represented by $[Fe(HPO_4)(H_2O)]^+$ in the presence of iron. Therefore, even when the recording ink composition is contaminated with iron as an impurity during its preparation steps, the iron reacts with the phosphorus-containing substance to form the ferric (III) phosphato complex ion. Owing to the formation of the complex ion, the ink is prevented from discoloration which would be otherwise caused by iron ion, and the ink is also prevented from formation and deposition of iron compounds. Accordingly, the recording ink according to the present invention provides an excellent color tone, and the ink makes it possible to avoid blocking at a nozzle of a printing head or the like of an ink-jet printer.

The phosphorus-containing substance may be one selected from the group consisting of phosphoric acids and phosphates. The phosphoric acids and phosphates readily form metaphosphate ion represented by $HPO_4^{2-}$ for forming the ferric (III) phosphato complex ion in an aqueous solution. Of the phosphoric acids and phosphates, phosphoric acid is especially preferred because of the following reason. Namely, phosphoric acid has no metal cation, and hence phosphoric acid makes it possible to decrease formation of deposited matters which may be formed by cations such as sodium and potassium ions.

The phosphorus-containing substance may be contained in the recording ink in such an amount that a number of moles of phosphorus in the phosphorus-containing substance exceeds a number of moles of iron contained in the recording ink. Iron may be contained as an impurity in the recording ink according to the present invention. Alternatively, iron may be contained therein as a constitutive component of a coloring agent or various additives.

The recording ink according to the present invention can be prepared, for example, by adding a phosphorus-containing substance for forming a ferric (III) phosphato complex ion represented by $[Fe(HPO_4)(H_2O)]^+$ in the presence of iron, to a recording ink material comprising water, a coloring agent, and iron.

According to a second aspect of the present invention, there is provided an ink cartridge comprising:

a recording ink comprising water, a coloring agent, iron, and a phosphorus-containing substance for forming a ferric (III) phosphato complex ion represented by $[Fe(HPO_4)(H_2O)]^+$ in the presence of iron;

an ink-impregnating material for being impregnated with the recording ink to be contained therein; and a main cartridge body for accommodating the ink-impregnating material. The ink cartridge of the present invention includes the recording ink according to the first aspect. Therefore, it is possible to provide the recording ink having an excellent color tone, and it is possible to avoid blocking at a nozzle of a printing head or the like of an ink-jet printer.

According to a third aspect of the present invention, there is provided an ink-jet recording method comprising the steps of:

allowing an ink-jetting nozzle to approach a recording area on an objective recording material; and jetting, from the ink-jetting nozzle, a recording ink comprising water, a coloring agent, iron, and a phosphorus-containing substance for forming a ferric (III) phosphato complex ion represented by $[Fe(HPO_4)(H_2O)]^+$ in the presence of iron. The ink-jet recording method of the present invention is based on the use of the recording ink according to the first aspect. Therefore, it is possible to provide printed matters having an excellent color tone, and it is possible to avoid blocking at a nozzle of a printing head or the like of an ink-jet printer.

DETAILED DESCRIPTION OF THE PREFERRED EMBODIMENT

The recording ink according to the present invention will be more specifically described below.

The recording ink according to the present invention contains the phosphorus-containing substance for readily forming the ferric (III) phosphato complex ion represented by the structural formula $[Fe(HPO_4)(H_2O)]^+$ in the presence of iron. Those desirably usable as the phosphorus-containing substance include phosphoric acids and phosphates. Specifically, those usable as the phosphoric acids include, for example, phosphoric acid (also called orthophosphoric acid), metaphosphoric acid, and pyrophosphoric acid. Those usable as the phosphates include, for example, primary phosphates such as sodium dihydrogenphosphate, potassium dihydrogenphosphate, and ammonium dihydrogenphosphate; and secondary phosphates such as disodium hydrogenphosphate, dipotassium hydrogenphosphate, diammonium hydrogenphosphate, and ammonium sodium hydrogenphosphate. Of the phosphorus-containing substances described above, phosphoric acid (orthophosphoric acid) is most preferred, because phosphoric acid has no metal cation, and it produces no deposited matter resulting from metal cation.

The phosphorus-containing substance is used in the ink composition in a ratio which is determined by a ratio of iron contained in the ink composition, since the phosphorus-containing substance and iron form the ferric (III) phosphato complex ion in the ink. The phosphorus-containing substance may be used in such an amount that the number of moles of phosphorus contained in the phosphorus-containing substance exceeds the number of moles of iron assumed to be contained in the ink. Judging from physical properties of the ink, for example, the phosphorus-containing substance is generally used in an amount of a range of about 0.001 to 5% by weight, preferably 0.01 to 1% by weight with respect to the total weight of the ink.

The recording ink according to the present invention contains iron. By the term "recording ink contains iron" as used herein is meant that iron is unconsciously contained as an impurity in the recording ink, as well as that iron is positively contained as a constitutive element of a coloring agent and an additive. In the case of the former meaning, for example, the recording ink may be mixed with iron as an impurity contained in a solvent such as water, or the ink may be mixed with iron in an environment involving the use of iron during preparation steps of the ink. Iron may be contained in the recording ink in an arbitrary form including, for example, simple substance (atom), compound, ion, and complex.

Those preferably used as the coloring agent in the ink composition according to the present invention include dyes used in a variety of fields of coloring. It is possible to use any water-soluble dye represented by, for example, direct dyes, acid dyes, basic dyes, and reactive dyestuffs. Such a water-soluble dye is generally used in a ratio to occupy about 0.1 to 10% by weight in conventional ink compositions. Preferably, in the present invention, the water-soluble dye is also used in the range described above. However, there is no special limitation thereto. Pigments can be also used as the coloring agent.

Water or a mixed solvent of water and a water-soluble organic solvent may be used as the solvent used for the ink composition according to the present invention. Those especially preferred include a mixed solvent of water and a water-soluble organic solvent. Polyvalent alcohols having an ink drying-preventive effect as exemplified below can be used as the water-soluble organic solvent. Deionized water is desirably used as the water, rather than ordinary water like tap water containing various ions.

The water-soluble organic solvent to be used as a mixture with water includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetoamide; ketones and ketoalcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol, and hexylene glycol; polyvalent alcohol lower alkyl ethers such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; glycerol; 2-pyrrolidone; N-methyl-2-pyrrolidone; and 1,3-dimethyl-2-imidazolidinone. Among them, those especially preferred include glycerol; alkylene glycols such as diethylene glycol; and polyvalent alcohol lower alkyl ethers such as triethylene glycol monoethyl ether.

The water-soluble organic solvent described above is generally contained in the ink composition in an amount of a range of 0 to 95% by weight, preferably 10 to 80% by weight, more preferably 10 to 50% by weight with respect to the total weight of the ink.

Water is simultaneously contained in the ink composition in an amount of a broad range which is determined depending on the type of the solvent component, the composition thereof, or desired characteristics of the ink. However, water is generally contained in the ink composition in a range of 10 to 95% by weight, preferably 10 to 70% by weight, more preferably 20 to 70% by weight with respect to the total weight of the ink.

The basic composition of the ink composition according to the present invention has been described above. Besides, it is possible to add a variety of conventionally known additives. Namely, it is possible to add, for example, dispersing agents, surfactants, viscosity-adjusting agents, surface tension-adjusting agents, pH-adjusting agents, and mildewproofing agents, if necessary. The additives include, for example, viscosity-adjusting agents such as polyvinyl alcohol, celluloses, and water-soluble resins; various surfactants such as cationic, anionic, and nonionic surfactants; and pH-adjusting agents such as diethanolamine and triethanolamine. When it is intended to prepare an ink composition to be used for an ink-jet recording method of the type in which a recording liquid is charged, the ink composition may be added with a specific resistance-adjusting agent such as inorganic salts including, for example, ammonium chloride.

Examples and Comparative Examples of the present invention will be explained below, however, the present invention is not limited thereto.

It is noted that "Xerox 4024 DP 201b" produced by Xerox was used as recording paper for printing performed in Examples and Comparative Examples, unless otherwise specified.

<EXAMPLE 1>

75 parts by weight of a dye solution "PROJET FAST BLACK 2" (produced by ZENECA, aqueous solution having a dye concentration of 4%), 10 parts by weight of glycerol, and 5 parts by weight of diethylene glycol n-monobutyl ether were added to 9.5 parts by weight of pure water. After that, 0.5 part by weight of phosphoric acid was added thereto. An obtained mixture was agitated for 30 minutes, followed by filtration with a membrane filter having a pore size of 0.7 μm to obtain a recording water-based ink. The ink composition was used to perform recording by using an ink-jet head of the shear mode type. As a result, the ink was favorably jetted. Thus, a high quality recorded matter was obtained with an excellent black color tone, which was recorded at a high concentration. The adopted ink-jet head of the shear mode type is described in U.S. Pat. No. 5,016,028, the content of which is incorporated hereinto by reference.

<EXAMPLE 2>

3.0 parts by weight of a dye solid material "DUASYN DIRECT TURQUISE BLEU FRL-SF VP368" (produced by HOECHST), 20 parts by weight of ethylene glycol, and 5 parts by weight of diethylene glycol n-monobutyl ether were added to 71.5 parts by weight of pure water. After that, 0.5 part by weight of phosphoric acid was added thereto. An obtained mixture was agitated for 30 minutes, followed by filtration with a membrane filter having a pore size of 0.7 μm to obtain a recording water-based ink. The ink composition was used to perform recording by using an inkjet head of the shear mode type disclosed in U.S. Pat. No. 5,016,028. As a result, the ink was favorably jetted, and an obtained recorded matter was excellent in color tone of a cyan color. A high quality recorded matter having good color balance was obtained in color printing performed by using yellow, cyan, and magenta.

<Comparative EXAMPLE 1>

75 parts by weight of a dye solution "PROJET FAST BLACK 2" (produced by ZENECA, aqueous solution having a dye concentration of 4%), 10 parts by weight of glycerol, and 5 parts by weight of diethylene glycol n-monobutyl ether were added to 9.8 parts by weight of pure water. After that, 0.2 part by weight of ethylenediaminetetraacetic acid as a chelating agent was added thereto. An obtained mixture was agitated for 30 minutes, followed by filtration with a membrane filter having a pore size of 0.7 μm to obtain a recording water-based ink. The ink was not excellent in black color tone. The ink composition was used to perform recording by using an ink-jet head of the shear mode type disclosed in U.S. Pat. No. 5,016,028. As a result, omission of a print image occurred during continuous printing with the black color on a sheet of A4 printing paper. When a jetting port was observed in an enlarged scale by using a microscope after completion of the printing, the jetting port was blocked with solid matters. An obtained recorded matter was not excellent in black color tone, which was recorded at a low concentration.

<Comparative EXAMPLE 2>

An ink was produced in the same manner as described in Example 2 except that 0.5 part by weight of phosphoric acid was not added. The obtained recording water-based ink was poor in color tone as a cyan ink. The ink composition was used to perform recording by using an ink-jet head of the shear mode type disclosed in U.S. Pat. No. 5,016,028. As a result, omission of a print image occurred during continuous printing with the cyan color on a sheet of A4 printing paper. When a jetting port was observed in an enlarged scale by using a microscope after completion of the printing, the jetting port was blocked with solid matters. An obtained recorded matter was not excellent in cyan color tone. In the case of color printing performed by using yellow, cyan, and magenta, an obtained recorded matter was intense in yellowish green color, and it was not so excellent in color balance.

Any of the recording water-based inks concerning Examples 1 and 2 had an excellent color tone, and succeeded in performing ink-jet recording in a stable manner. The yellow color, which would be otherwise caused by iron, disappeared in any of the inks concerning Examples 1 and 2, owing to the addition of phosphoric acid. Thus, the prepared recording water-based inks suffered no deposition of solid matters, making it possible to perform printing in a stable manner by means of ink-jet recording.

On the contrary, any of Comparative Example 1 constructed by using the chelating agent and Comparative Example 2 constructed by adding no phosphoric acid failed to provide a recording water-based ink capable of satisfying the performance as described above.

The recording ink according to the present invention can be used by being accommodated in an ink cartridge for ink-jet printers. More specifically, a porous material accommodated in the ink cartridge can be impregnated with the recording ink according to the present invention. It is possible to use any ink cartridge having any arbitrary structure. For example, it is possible to use an ink cartridge described in U.S. Pat. No. 5,509,140. Details of the structure and material of the ink cartridge are described in U.S. Pat. No. 5,509,140, the content of which is incorporated hereinto by reference.

As clarified from the facts described above, the recording ink according to the present invention contains at least water, a coloring agent, and iron as an element having an atomic number of 26, the recording ink being mixed with the substance containing phosphorus as an element having an atomic number of 15 to form the ferric (III) phosphato complex ion represented by the structural formula $[Fe(HPO_4)(H_2O)]^+$. Accordingly, the recording water-based ink is prevented from discoloration which would be otherwise caused by iron. Further, the recording water-based ink is prevented from deposition of iron compounds, owing to the formation of the complex ion. Therefore, the obtained recording water-based ink has a good color tone.

Phosphoric acids or phosphates are preferably used as the phosphorus-containing substance. Thus, the metaphosphoric acid ion represented by $HPO_4^{2-}$ is readily formed in an aqueous solution. Accordingly, the recording water-based ink at a high concentration is prevented from discoloration which would be otherwise caused by iron. Further, the recording water-based ink is prevented from deposition of high concentration iron compounds, owing to the formation of the complex ion. Therefore, the obtained recording water-based ink has an excellent color tone. Especially, when phosphoric acid is used as the phosphorus-containing substance, it is possible to minimize occurrence of deposited matters which would be otherwise brought about due to the influence of metal cations. Thus, the recording water-based ink having a good color tone is obtained.

The ink-jet recording method of the present invention is based on the use of the recording ink according to the present invention. Therefore, the ink is prevented from discoloration which would be otherwise caused by iron. Thus, the color tone of the ink does not change. Further, the ink is prevented from deposition of iron compounds, owing to the formation of the complex ion, and hence the ink-jet head suffers no blocking. Therefore, it is possible to perform ink-jet recording in a comfortable manner.

The present invention may be practiced or embodied in other various forms without departing from the spirit or essential characteristics thereof. It will be understood that the scope of the present invention is indicated by the appended claims, and all variations and modifications concerning, for example, the type of the coloring agent, the origin or form of iron, and the type of other additives, which come within the equivalent range of the claims, are embraced in the scope of the present invention.

What is claimed is:

1. A recording ink comprising:

water;

a coloring agent;

iron; and a phosphorus-containing substance for forming a ferric (III) phosphato complex ion represented by $[Fe(HPO_4)(H_2O)]^+$ in the presence of iron.

2. The recording ink according to claim 1, wherein the phosphorus-containing substance is one selected from the group consisting of phosphoric acids and phosphates.

3. The recording ink according to claim 2, wherein the phosphorus-containing substance is phosphoric acid.

4. The recording ink according to claim 1, wherein the ferric (III) phosphato complex ion represented by $[Fe(HPO_4)(H_2O)]^+$ formed by the iron and the phosphorus-containing substance is contained in the recording ink.

5. The recording ink according to claim 1, wherein the phosphorus-containing substance is contained in the recording ink in such an amount that a number of moles of phosphorus in the phosphorus-containing substance exceeds a number of moles of iron contained in the recording ink.

6. The recording ink according to claim 1, wherein the iron is contained as an impurity in the recording ink.

7. The recording ink according to claim 1, wherein the iron is contained in the coloring agent.

8. The recording ink according to claim 1, wherein the coloring agent is a water-soluble dye.

9. The recording ink according to claim 1, further comprising a water-soluble organic solvent.

10. A recording ink prepared by adding a phosphorus-containing substance for forming a ferric (III) phosphato complex ion represented by $[Fe(HPO_4)(H_2O)]^+$ in the presence of iron, to a recording ink material comprising water, a coloring agent, and iron.

11. The recording ink according to claim 10, wherein the phosphorus-containing substance is at least one selected from the group consisting of phosphoric acids and phosphates.

12. The recording ink according to claim 11, wherein the ferric (III) phosphate complex ion represented by $[Fe(HPO_4)(H_2O)]^+$ is contained in the recording ink.

13. An ink cartridge comprising:

a recording ink comprising water, a coloring agent, iron, and a phosphorus-containing substance for forming a ferric (III) phosphato complex ion represented by $[Fe(HPO_4)(H_2O)]^+$ in the presence of iron;

an ink-impregnating material for being impregnated with the recording ink to be contained therein; and a main cartridge body for accommodating the ink-impregnating material.

14. The ink cartridge according to claim 13, wherein the phosphorus-containing substance is at least one selected from the group consisting of phosphoric acids and phosphates.

15. The ink cartridge according to claim 14, wherein the ferric (III) phosphato complex ion represented by $[Fe(HPO_4)(H_2O)]^+$ is contained in the recording ink.

16. An ink-jet recording method comprising the steps of:

allowing an ink-jetting nozzle to approach a recording area on an objective recording material; and jetting, from the ink-jetting nozzle, a recording ink comprising water, a coloring agent, iron, and a phosphorus-containing substance for forming a ferric (III) phosphato complex ion represented by $[Fe(HPO_4)(H_2O)]^+$ in the presence of iron.

17. The ink-jet recording method according to claim 16, wherein the phosphorus-containing substance is one selected from the group consisting of phosphoric acids and phosphates.

18. The ink-jet recording method according to claim 17, wherein the phosphorus-containing substance is phosphoric acid.

19. The ink-jet recording method according to claim 17, wherein the ferric (III) phosphato complex ion represented by $[Fe(HPO_4)(H_2O)]^+$ is contained in the recording ink.

20. The ink-jet recording method according to claim 16, wherein the iron is contained as an impurity in the recording ink.

* * * * *